(12) United States Patent
Gulati et al.

(10) Patent No.: US 8,850,004 B2
(45) Date of Patent: Sep. 30, 2014

(54) METHODS AND SYSTEMS FOR DETECTING ANOMALIES DURING IO ACCESSES

(71) Applicant: VMware, Inc., Palo Alto, CA (US)

(72) Inventors: Ajay Gulati, Palo Alto, CA (US); Irfan Ahmad, Mountain View, CA (US); Jyothir Ramanan, Sunnyvale, CA (US); Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/859,650

(22) Filed: Apr. 9, 2013

(65) Prior Publication Data

US 2013/0238790 A1   Sep. 12, 2013

Related U.S. Application Data

(63) Continuation of application No. 12/834,324, filed on Jul. 12, 2010, now Pat. No. 8,417,812.

(51) Int. Cl.
| | | |
|---|---|---|
| *G06F 15/173* | (2006.01) | |
| *G06F 11/00* | (2006.01) | |
| *G06F 3/06* | (2006.01) | |
| *H04L 12/26* | (2006.01) | |
| *H04L 29/14* | (2006.01) | |
| *H04L 12/70* | (2013.01) | |
| *H04L 29/08* | (2006.01) | |

(52) U.S. Cl.
CPC ............ *H04L 43/0876* (2013.01); *G06F 11/00* (2013.01); *G06F 3/06* (2013.01); *H04L 43/0852* (2013.01); *H04L 69/40* (2013.01); *H04L 47/00* (2013.01); *H04L 67/1097* (2013.01)
USPC .......................................... 709/224; 709/225

(58) Field of Classification Search
CPC ................................... H04L 41/5003–41/5025
USPC ......................................... 709/223–226, 240
See application file for complete search history.

(56) References Cited

U.S. PATENT DOCUMENTS

| | | | |
|---|---|---|---|
| 6,643,260 B1 * | 11/2003 | Kloth et al. .................... 370/235 |
| 7,912,951 B2 * | 3/2011 | Gulati et al. ................... 709/224 |
| 8,295,177 B1 * | 10/2012 | Bharghavan et al. ......... 370/235 |
| 2004/0194095 A1 * | 9/2004 | Lumb et al. .................... 718/100 |
| 2006/0246844 A1 * | 11/2006 | Kroboth et al. ............. 455/67.11 |
| 2008/0320278 A1 * | 12/2008 | Liang et al. ...................... 712/29 |
| 2011/0085512 A1 * | 4/2011 | Lin et al. ......................... 370/329 |
| 2013/0227111 A1 * | 8/2013 | Wright et al. .................. 709/223 |

\* cited by examiner

*Primary Examiner* — Brendan Higa

(57) ABSTRACT

An anomaly in a shared input/output (IO) resource that is accessed by a plurality hosts or clients is detected when a host that is not bound by any QoS policy presents large workloads to a shared IO resource that is also accessed by hosts or clients that are governed by QoS policy. The anomaly detection triggers a response from the hosts or clients as a way to protect against the effect of the anomaly. The response is an increase in window sizes. The window sizes of the hosts or clients may be increased to the maximum window size or in proportion to their QoS shares.

20 Claims, 6 Drawing Sheets

METHODS AND SYSTEMS FOR DETECTING ANOMALIES DURING IO ACCESSES

CROSS REFERENCE TO RELATED APPLICATIONS

This application is a continuation of and claims the benefit of U.S. patent application Ser. No. 12/834,324 (now issued as U.S. Pat. No. 8,417,812) filed on Jul. 12, 2010 and entitled "Methods and Systems for Detecting Anomalies during IO Access," which is hereby incorporated by reference in its entirety. This application is also related by subject matter to the U.S. patent application Ser. No. 12/260,041 (now U.S. Pat. No. 8,250,197) and Ser. No. 12/260,054 (now U.S. Pat. No. 7,912,951), both filed Oct. 28, 2008 and entitled "Quality of Service Management" and both of which are also incorporated herein by reference in their entirety.

BACKGROUND

Modern data centers often have a multi-tier configuration wherein a front end server accesses one or more layers of middle-tier and back-tier servers for various services. One example of a back-end server is a storage array. Storage arrays form the backbone of modern data centers by providing consolidated data access to multiple applications simultaneously. Increasingly, organizations are moving towards consolidated storage, either using block-based access over a Storage Area Network (SAN) or file-based access over Network-Attached Storage (NAS) systems. A Storage Area Network is a network whose primary purpose is the transfer of data between computer systems and storage elements. Easy access from anywhere at anytime, ease of backup, flexibility in allocation and centralized administration are some of the advantages of storage arrays.

Quality of Service (QoS) refers to resource management methodologies whereby resources are allocated among a plurality of users or clients according to a policy. The policy may guarantee a minimum and/or maximum level of service (e.g., as a percentage of resources), or it may set limits and reservations which are expressed in absolute units, such as MHz or GHz for CPU resource allocation, GB for memory or disk resource allocation, and Mbps or Gbps for network bandwidth resource allocation. A "limit" is a maximum level of service expressed in terms of absolute units and a "reservation" is a minimum level of service expressed in terms of absolute units. It is also common to distribute services according to assigned resource "shares" (also known as "weights") so that each client is provided a level of service that compares to its peers at the same ratio as the assigned shares. In addition, combinations of these policies are possible. Thus, QoS suggests an ability to evenly distribute services or arbitrarily assign priority to selected applications, users, or data flows. QoS management, however, may be complicated when a client that is not bound by a QoS policy accesses a shared resource. Such client may consume services at a rate that impacts the level of service received by the clients that are bound by the QoS policy. In some situations referred to herein as an "anomaly," the workload presented by the client not bound by the QoS policy is so large that it interferes with the proper distribution of resources, such as IO access bandwidth, to clients in accordance with the QoS policy.

SUMMARY

One or more embodiments of the invention provide a method for detecting an anomaly in a shared input/output (IO) resource that is accessed by a plurality of hosts or clients. The anomaly detection triggers a response from the hosts or clients as a way to protect against the effect of the anomaly.

In one embodiment, the anomaly is caused and detected when a host that is not bound by any QoS policy presents large workloads to a shared IO resource that is also accessed by hosts that are governed by QoS policy. When an anomaly is detected, the hosts that are governed by QoS policy respond to the anomaly by increasing their window sizes. The window sizes of these hosts may be increased to the maximum window size or in proportion to their QoS shares.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1A:
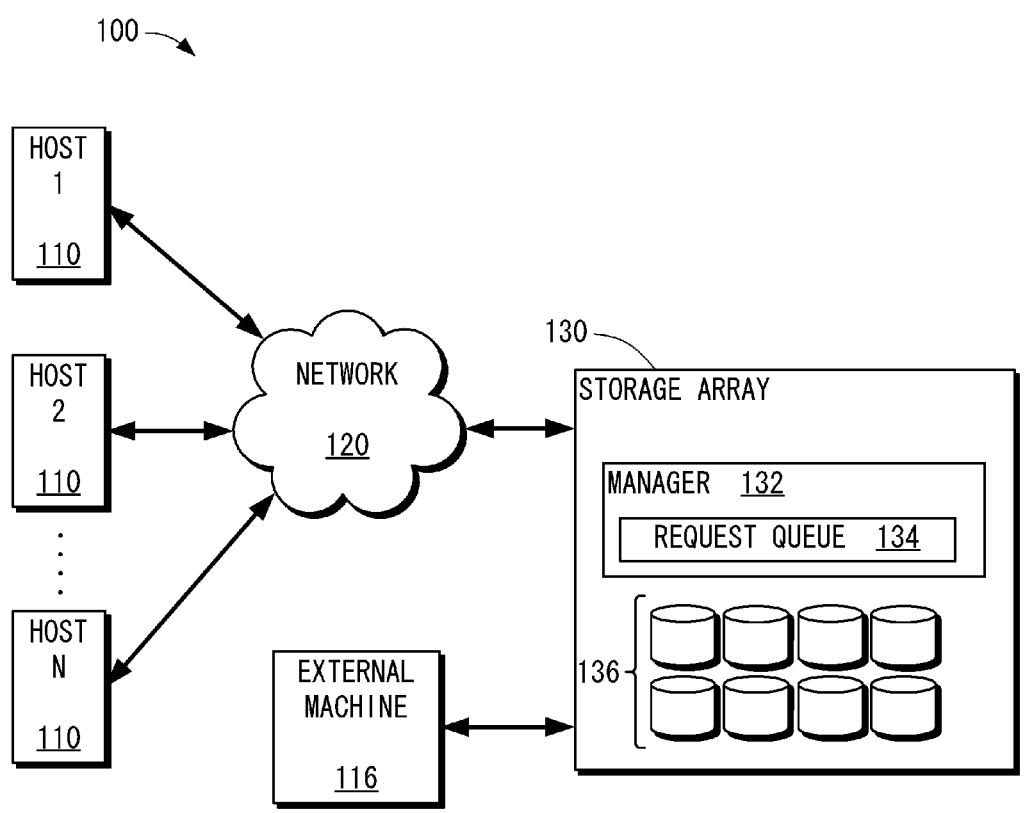
FIG. 1A illustrates a system having a plurality of hosts and an unmanaged client accessing a common storage array, which may benefit from one or more embodiments of the present invention.

FIG. 1A is a block diagram that shows by way of example a system 100 having a plurality of hosts 110 connected through interconnect network 120 to a shared resource such as storage array 130. There may be any number n of hosts 110, each of which may comprise a general purpose computer system having one or more applications, virtual machines, or other entities, accessing data stored on storage array 130. An unmanaged client 116 is also connected to the shared resource, storage array 130. Unmanaged client 116 may also comprise a general purpose computer system having one or more applications, virtual machines, or other entities. It is referred to herein as "unmanaged" is because it is not bound by any QoS policy or management that is applied to hosts 110. Unmanaged client 116 may be coupled to storage array 130 through interconnection network 120 or, as illustrated, directly connected. In one embodiment, unmanaged client 116 is located on a host that is separate from hosts 110 that are being managed according to QoS policy. However, in different embodiments, unmanaged client 116 may be a virtual machine running on one of the managed hosts with direct passthrough access to a dedicated physical host bus adapter on the managed host, such that the hypervisor of the managed host does not interpose on the passthrough virtual machine's IO, and thus cannot throttle it as it can for non-passthrough virtual machines.

Interconnect network 120 may be a wide area network, a local area network, or a network hosting a protocol especially suited for storage arrays, such as Fibre Channel, iSCSI, HyperSCSI, etc. For example network 120 may comprise one or more of Fibre Channel switches. Storage array 130 may be any type of storage array such as a network-attached storage (NAS) filer or a blocked-based device over a storage area network (SAN). Storage array 130 may include a manager 132 and an array of devices 136 (e.g., disks). Manager 132 is a computer program executing on one or more processors, which may be implemented as an appliance or a plurality of appliances working in tandem. Manager 132, may, for example, comprise a plurality of storage processors, as generally understood in the art of storage arrays. While storage arrays are typically made up of a plurality of disks, it should be recognized that as prices for solid-state non-volatile storage devices fall, they are increasingly taking the place of rotating disk storage media. The use of the term, "disk" herein, should therefore not be construed as limited only to rotating disk storage media, but also what is become known as solid state disks, or "SSDs."

Manager 132 maintains a request queue 134, which is a list of pending IO requests that may be satisfied in any order. Each request comprises a request to read and/or write data to or from storage array 130. Each read request identifies an address, address range or other identifier of the data to be read whereas write requests include data to be written along with an identifier for a location in the array where the data is to be written. Each request that is pending in request queue 134 corresponds to a request from one of hosts 110.

Figure 1B:
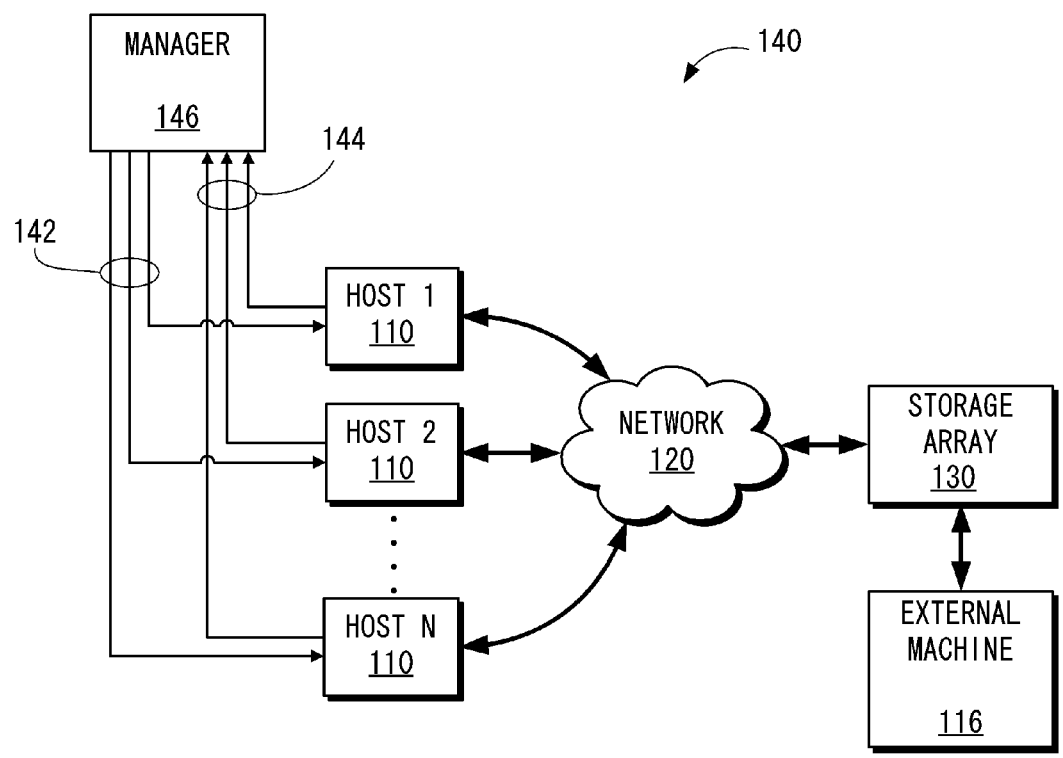
FIG. 1B illustrates the system of FIG. 1A configured with centralized control.

Although QoS policy for hosts 110 governs their accesses to storage array 130, unmanaged client 116 is not bound by any such policy. As a result, large workloads presented by unmanaged client 116 may cause an undesirable reduction in the available IO access bandwidth and interfere with the IO access bandwidth management of hosts 110. In one embodiment, hosts 110 are configured to detect when the IO access bandwidth between hosts 110 and storage array 130 is reduced. If the reductions are severe enough, they may be identified as an anomaly, and hosts 110 adapt to protect against the effects of the anomaly. In another embodiment, shown in FIG. 1B, a manager 146, which is a computer program that resides and executes in a central sever, or alternatively, in any one of hosts 110, detects when the IO access bandwidth between hosts 110 and storage array 130 is reduced. If the reductions are severe enough and identified as an anomaly by manager 146, manager 146 communicates with each of hosts 110 to adapt to protect against the effects of the anomaly.

Figure 2:
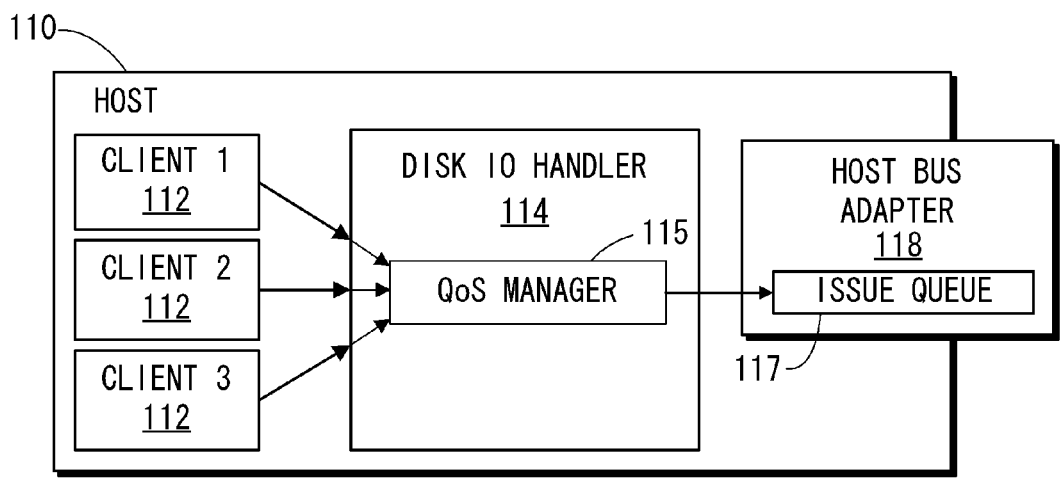
FIG. 2 shows an exemplary host.

FIG. 2 shows an exemplary host 110. Host 110 includes a plurality of clients 112, a disk IO handler 114, and a host bus adapter (HBA) 118. As used herein, the term, "client" is intended to be broadly interpreted as a software entity such as a process, a user login, an application, a virtual machine, a collection of any of the above, etc. In an exemplary non-virtualized system, each client 112 may be an application running on a host operating system (not shown) which includes disk IO handler 114. Disk IO handler 114 may be an integrated component of the host operating system, i.e., the OS kernel, or it may be a driver or other external component. In either case, each client 112 may issue IO requests (read or write) to disk IO handler which implements a quality of service (QoS) manager 115. QoS manager 115 receives each request and, in accordance with a control algorithm such as that described below, immediately or eventually passes the request to issue queue 117 of host bus adapter 118 and to storage array 130 (FIG. 1). Although generally implemented in hardware as shown in FIG. 2, it is also possible for all or part of issue queue 117 to be implemented in software, e.g., as described in detail below. Issue queue 117 reflects a list of IO requests pending at storage array 130. The term "queue" should not be narrowly construed as a first-in, first-out (FIFO) buffer, but simply a list of pending requests that may be satisfied in any order by storage array 130. In one embodiment, issue queue 117 comprises a set of elements that maintain dispatch and completion information about requests from clients 112 outstanding at storage array 130.

When issue queue 117 is implemented in hardware as part of the HBA for each host, issue queue 117 may have a maximum size that can be exceeded by the total number of requests from clients 112. To accommodate these "overflow" IO requests, a buffer (not shown) in the disk IO handler 114 may receive overflow IO requests from all clients when issue queue 117 is full. In one embodiment, the buffer is a first-in, first-out (FIFO) buffer. When an IO request is satisfied, a slot in the issue queue is opened, and the next (longest-residing) IO request in the buffer is sent to the HBA 118. Although in this embodiment the buffer is a FIFO buffer in which the longest-residing IO request is removed, other algorithms may be implemented, such as preferentially selecting IOs in series that are close to one other.

In another embodiment a separate buffer is provided for each client. When an IO request is issued by a host 110, a new IO request from one of the separate buffers takes its place in the issue queue 117. User-set shares (also sometimes referred to as "weights") for each client on the host can be implemented by changing the frequency of IO request draw from the corresponding client. For example, if clients 1, 2, and 3 are given shares of 100, 200, and 300, respectively, then for every one IO request pulled from the buffer associated with client 1, two IO requests are pulled from the buffer associated with client 2 and three IO requests are pulled from the buffer associated with client 3. It should be noted that some HBAs may be configured to directly manage a plurality of issue queues, so that there could be separately managed individual issue queues for each client. Also, scheduling policies other than proportional sharing, such as scheduling algorithms based on priorities, tokens, credits, reservations, or limits associated with each client, may be implemented in this embodiment.

Figure 3:
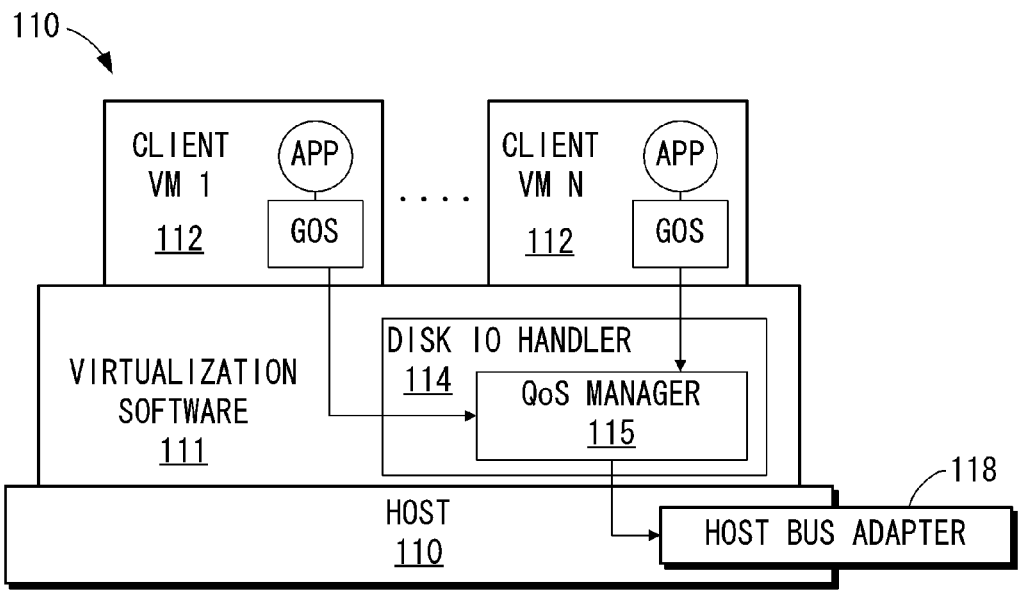
FIG. 3 shows a host comprising a virtualized computer system.

FIG. 3 shows one embodiment of host 110 that comprises a virtualized computer system wherein each client 112 is a virtual machine (VM) and disk 10 handler 114 is implemented by virtualization software 111, or a component thereof or attached thereto. Virtualization software 111 may be implemented as one or more layers of software logically interposed between and interfacing with clients 112 as physical hardware of host 110. In one embodiment, virtualization software 111 comprises a virtualization kernel (not shown) for managing physical resources and a virtual machine monitor (VMM) (not shown) for each client 112 for emulating virtual hardware and devices with which software within client 112 interacts. In another embodiment, virtualization software includes a host operating system (not shown) for managing physical resources. These and other virtualization configurations are well known in the field of computer virtualization. Any number N of clients 112 may execute concurrently on host 110 using virtualization software 111, the number N being limited only by physical resources such as memory and processing bandwidth.

Each VM may include a guest operating system (GOS) and one or more applications (APP). The guest operating systems may be a commodity operating system such as Microsoft Windows® or a specialized operating system designed specifically to work with virtualization software 111 (sometimes referred to as a "paravirtualized OS"). In one embodiment, virtualization software 111 resides on a physical data storage medium (not shown) forming part of host 110, whereas virtual disks (not shown) for each client virtual machine are mapped by virtualization software 111 to files that reside remotely or locally. The guest operating system and applications access data at storage array 130 by way of a virtual host bus adapter (not shown) that is mapped by virtualization software 111 to host bus adapter 118. Note that this need not be a one-to-one mapping; e.g., there could be several virtual disk controllers in the guest and multiple physical HBAs on the host. In this case, the virtualization software may choose to send individual requests via different physical HBAs.

If one or more of hosts 110 have one or more VMs running, it may be desirable to assign a QoS share for each VM. For example, one host 110 may have two VMs, wherein one of the VMs requires faster response time. In this case, it would be desirable to provide greater QoS shares to the VM requiring the faster response time. A similar situation can occur for non-VM clients as well, wherein an operating system can give greater shares to one running application in preference to other running applications. Using the QoS policy it is possible, in some embodiments described below, to separately assign shares to individual clients.

Because storage array 130 is a shared resource, contention at storage array 130, e.g., at the array controller, cache, buses, and disk arms, may lead to unpredictable IO completion times. These features of storage array 130 complicate efforts to fairly distribute services among hosts 110 according to a QoS policy. Various techniques have been developed to fairly distribute accesses to a common resource among a plurality of hosts 110 according to QoS policy, one of which is described in U.S. patent application Ser. No. 12/260,041, filed Oct. 28, 2008, the entire contents of which are incorporated by reference herein. In U.S. patent application Ser. No. 12/260,041, a control algorithm is described that manages issue queue sizes, also referred to as "window sizes," based in part on a calculation of a moving average latency, referred to as "current average latency" or CAL. CAL for host 110 at time t may be as computed according to Equation 1:

$$CAL(t) = (1-\alpha) \times L + \alpha \times CAL(t-1) \qquad \text{(Eq. 1)}$$

In Equation 1, L is the current latency at host 110. Current latency L is the issue queue residency time for the IO request most recently removed from issue queue 117 (FIG. 2). An IO request is added to issue queue 117 when the IO request is issued to storage array 130 and removed from issue queue when an acknowledgement of fulfillment of the request is received by host 110. The value t for "time" may be construed literally such that CAL is periodically calculated in response to a clock signal, but in one embodiment, time t refers to request count, so that CAL is calculated every time, or every X times, a request is satisfied and removed from issue queue 117. As can be seen by Equation 1, $\alpha$ values closer to one will result in less oscillation but slower reaction time. In certain embodiments, for example, a is set very close to one, e.g., 0.99, thereby effectively taking an average over a few hundred IO requests.

The control algorithm that manages window sizes implements Equation 2.

$$w(t+1) = (1-\gamma)w(t) + \gamma\left(\frac{LAT_{threshold}}{L_{SYS}(t)}w(t) + \beta\right) \qquad \text{(Eq. 2)}$$

Equation 2 solves for a new window size w(t+1), where w(t+1) is the adjusted window size for time t+1; w(t) is the current window size; $\gamma$ is a constant value; $LAT_{threshold}$ is a system-wide latency threshold selected to balance throughput with latency; $L_{SYS}(t)$ is the system-wide average latency across hosts 110 at time t; and $\beta$ is a per-host value based on an assigned share representing a relative level of priority of the host relative to other hosts. The constant $\gamma$ is a value selected between zero and one and defines how much influence the current window size has over the new window size. The lower the value of gamma, the more weight is given to the current window size w(t).

Embodiments of the present invention may implement any technique for implementing QoS policy, including the window size adjustment technique described above. However, unmanaged client 116 is not bound by any QoS policy, and so large workloads presented by unmanaged client 116 would cause a proportionally large reduction in the IO access bandwidth available to hosts 110 and throttling of IO requests by hosts. Embodiments of the present invention provide methods for detecting such situations and implementing countermeasures to protect against the effect of such situations on the IO access bandwidth management of hosts 110.

In one embodiment, when an anomaly is detected, the window sizes of all of hosts 100 are no longer adjusted in accordance with QoS policy, but instead are increased to its maximum size. In another embodiment, host 110 that has the largest QoS share is increased to its maximum size, and the remaining hosts 110 are allocated window sizes in relative proportion according to their QoS shares.

According to one or more embodiments of the present invention, an anomaly is detected based on various IO statistics. The first is a value known as a latency threshold, $LAT_{Threshold}$. This value may be set empirically based on the relationship between latency and throughput. $LAT_{Threshold}$ may be a fixed constant that is the same for all hosts 110 or may be a programmable value. A typical conservative value for $LAT_{Threshold}$ would be between 30 and 50 milliseconds. In one embodiment, $LAT_{Threshold}$ is a user-adjustable parameter with a broad range, e.g., 5-100 milliseconds. User input could therefore be used to set the threshold based on application-specific requirements. In addition to QoS fairness, efficient utilization of the storage array and a work-conserving algorithm are important goals. In another embodiment, $LAT_{Threshold}$ can also be adjusted by observing the long-term behavior of the workload. This observation may be performed by a central entity (e.g., manager 146) that can obtain latency and bandwidth information from all hosts 110 and observe the latency values that correspond to various peaks in the observed bandwidth.

Other IO statistics include current average latency and the number of outstanding IO requests (OIOs). These statistics are maintained for each host 110 and compiled at periodic intervals. Any technique for computing current average latency may be employed, including those disclosed in U.S. patent application Ser. No. 12/260,041. In addition, current average latency values that are normalized with respect to IO request sizes may be used.

Figure 4:
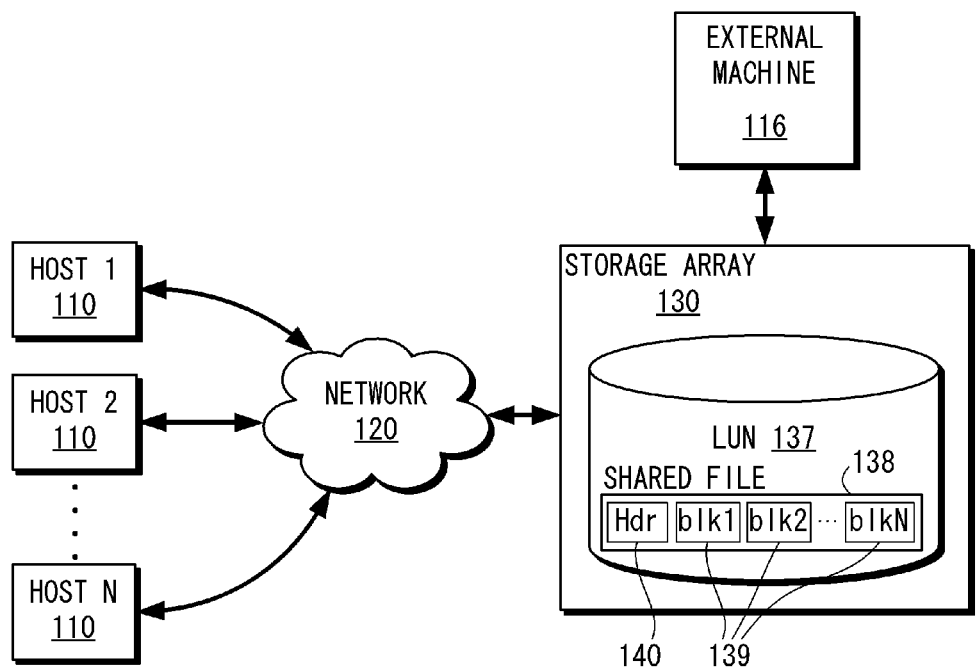
FIG. 4 shows a storage array of FIGS. 1A and 1B that stores a shared file that maintains statistics used in one or more embodiments of the present invention.

In one embodiment, as illustrated in FIG. 4, the IO statistics are stored in a shared file 138 that is part of a shared file system volume (LUN) 137. In this embodiment, shared file 138 is accessed by multiple hosts 110 simultaneously. Each host 110 owns a single corresponding disk block 139 of shared file 138 and periodically writes its current average latency value and the number of OIOs into that block. The window size for each host 110 is also stored in shared file 138.

An example of shared file 138 is shown below in TABLE 1. Shared file 138 includes a header portion 140 in which an anomaly flag is stored, and a body portion with a plurality of blocks 139. In each block 139, a history of each corresponding host's OIO values, current average latency values, and window size values are stored. Storing a history allow host 110 or manager 146 to differentiate between a persistent workload presented by unmanaged client 116 and a workload of short duration. The persistent workload should be recognized in order to configure hosts 110 to compete with unmanaged client 116 while a workload of short duration may be ignored. As shown in TABLE 1, shared file 138 stores IO statistics for five different time samples, e.g., t, t−1, t−2, t−3, and t−4.

of time intervals, e.g., 3. The current average latency ($LAT_{Average}$) of all hosts 110 is also computed. At steps 510, 515, 520, and 525, these computed values are compared against predefined values. An anomaly is detected and an anomaly flag is set (step 530) if all of the conditions are true. An anomaly is not detected (step 535) if at least one of the conditions is not true.

For example, if the current average latency is not near the latency threshold (e.g., $LAT_{Threshold}$-k) (step 510), an anomaly is not detected. The value of k is a constant that is configurable and represents how near the current average latency needs to be to the $LAT_{Threshold}$ in order to possibly trigger the anomaly detection and response. That is, if hosts 110 are not experiencing undesirably long latencies such that the current average latency of hosts 110 is less than the value represented by $LAT_{Threshold}$-k, an anomaly is not detected (step 535). On the other hand, if the current average latency is near the latency threshold (i.e., greater than the value represented by $LAT_{Threshold}$-k), and the conditions set forth in steps 515, 520, and 525 are met, an anomaly is detected and the anomaly flag is set (step 530). In other words, under the condition where the current average latency is near the

TABLE 1

ANOMALY FLAG: TRUE/FALSE

Host/Client

|  | OIO values | | | | | Latency (L) values | | | | | Window Size (W) values | | | | |
| --- | --- | --- | --- | --- | --- | --- | --- | --- | --- | --- | --- | --- | --- | --- | --- |
|  | t−4 | t−3 | t−2 | t−1 | t | t−4 | t−3 | t−2 | t−1 | t | t−4 | t−3 | t−2 | t−1 | t |
| Block 1 | 25 | 20 | 20 | 18 | 25 | 23 | 23 | 17 | 19 | 21 | 32 | 28 | 28 | 24 | 32 |
| Block 2 | 20 | 18 | 18 | 15 | 23 | 15 | 15 | 10 | 12 | 15 | 28 | 23 | 23 | 16 | 32 |
| Block N | 12 | 10 | 9 | 8 | 12 | 12 | 12 | 8 | 13 | 15 | 16 | 12 | 12 | 8 | 32 |

Each host 110 is able to update its own IO statistics stored in the shared file 138. However, the entries in the shared file 138 may be read by any of hosts 110. Since each host 110 may update the statistics independently, the time associated with each sample may be different, i.e., t−2 for each of hosts 110 may be a different absolute time. In addition, each host 110 has read/write access to header portion 140. Consequently, any of hosts 110 can set or clear the anomaly flag, as well as respond to an anomaly condition even though the anomaly may have been detected by another host 110.

In another embodiment of the present invention, shared file 138 only stores the current values of the IO statistics. Referring to TABLE 1, this means that only the "t" values of OIO, latency, and window size will be maintained by shared file 138, and the history data (t−1, t−2, t−3, and t−4 data) are stored in memory at the respective hosts 110. In addition, the number of time samples covered by the history data is a parameter that is configurable by the hosts 110.

As an alternative to shared file 138, IO statistics may be maintained in raw blocks on a shared storage partition, or maintained individually at each host/client and communicated to each other using network communication.

Figure 5A:
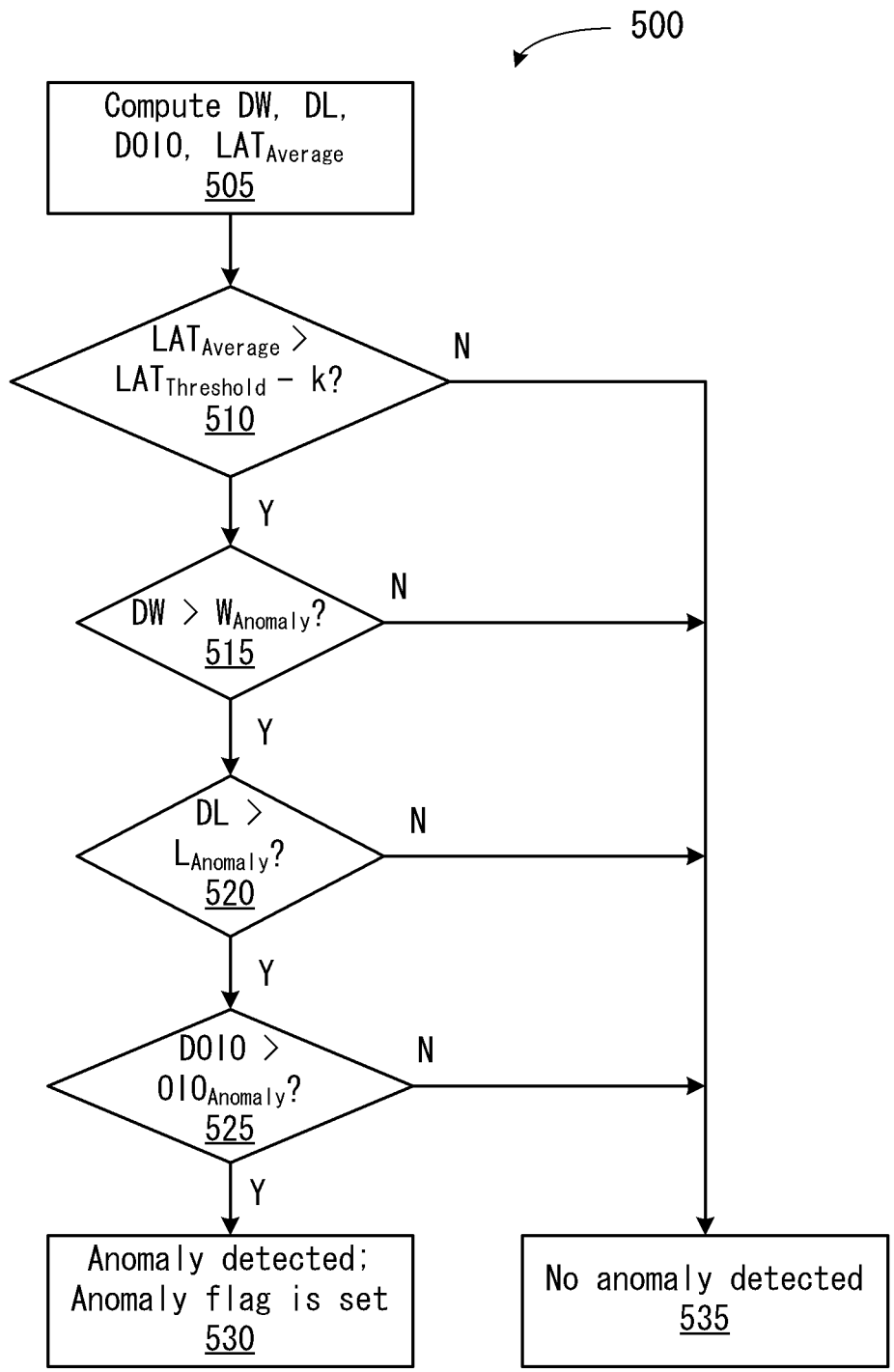
FIG. 5A shows a diagram illustrating a method for detecting an anomaly according to one or more embodiments of the present invention.

FIG. 5A shows a diagram illustrating a method 500 for detecting an anomaly according to one or more embodiments of the present invention. Any of hosts 110 or manager 146 may perform the method steps shown in flowchart 500. At step 505, host 110 or manager 146 computes a reduction in the aggregate window size ($\Delta W$) of all hosts 110, an average latency value change ($\Delta L$) of all hosts 110, and a change in the number of OIOs ($\Delta OIO$) of all hosts 110 over a fixed number latency threshold, if the aggregate window size has decreased sufficiently (i.e., $\Delta W > W_{Anomaly}$) over a certain time period (step 515), and the number of OIOs of all hosts 110 have also decreased by at least a certain amount (denoted as $OIO_{Anomaly}$), but the latency has not decreased by more than a small threshold (denoted as $L_{Anomaly}$), over the same period (i.e., $\Delta L > L_{Anomaly}$ and $\Delta OIO > OIO_{Anomaly}$; steps 520 and 525), an anomaly is detected and the anomaly flag is set (step 530). If any of the conditions set forth in steps 515, 520, and 525 is not met, an anomaly is not detected (step 535).

In one embodiment, $\Delta W$ is computed as (Wp−Wc)/Wc, where Wp is the window size during a prior time period and Wc is the window size during the current time period; $\Delta L$ is computed as (Lma−Lp)/Lp, where Lp is the average latency during a prior time period and Lma is the moving average of the average latency; and $\Delta OIO$ is computed as (OIOp−OIOma)/OIOma, where OIOp is the number of OIOs of all hosts 110 during a prior time period and OIOma is the moving average of the number of OIOs of all hosts 110. The values of $W_{Anomaly}$, $L_{Anomaly}$, and $OIO_{Anomaly}$ may each be fixed or programmed. In one exemplary embodiment, these values are selected to be 0.3, −0.05, and 0.1, respectively.

In another embodiment, the change in the ratio of $LAT_{Average}$ to OIO may be computed and evaluated for drastic changes, which can be detected in various ways, including:

- Look at the change in any interval and check if the percentage change from the prior interval is above a predefined threshold. If so, the change is considered drastic and the anomaly flag is set.
- Compute a slow moving average of the ratio and a fast moving average of the ratio and check if the difference between the two averages is above a predefined threshold. If so, the change is considered drastic and the anomaly flag is set. In one example, a slow moving average may be implemented as a moving average of the last 200 ratio samples, whereas a fast moving average may be implemented as a moving average of the last 50 ratio samples.

In other embodiments, an anomaly may be detected using any known pattern matching, machine learning, or statistical analysis techniques to identify cases where array performance continues to worsen despite continued throttling of IOs from managed clients.

Figure 5B:
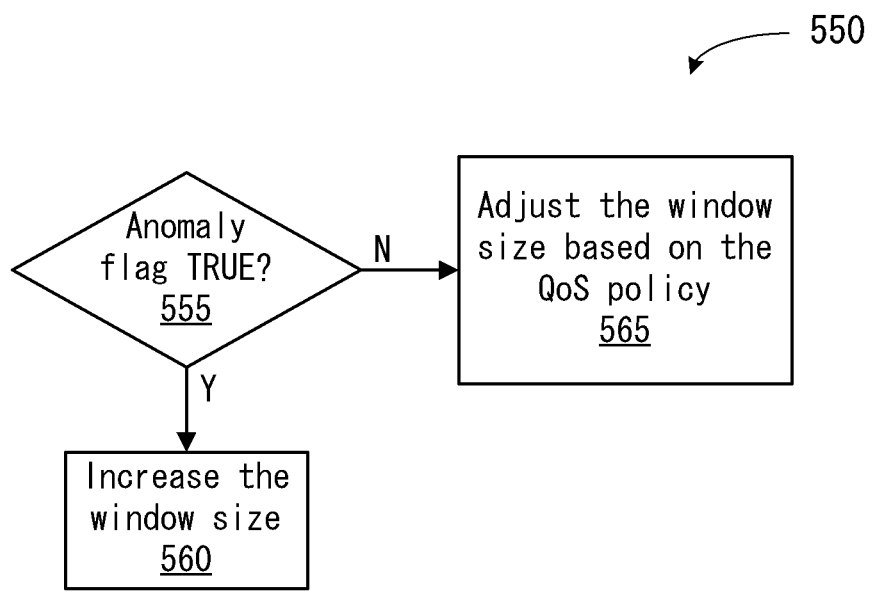
FIG. 5B shows a diagram illustrating a method for responding to a detected anomaly according to one or more embodiments of the present invention.

FIG. 5B shows a diagram illustrating a method 550 for responding to a detected anomaly according to one or more embodiments of the present invention. Each host 110 may periodically perform the method steps shown in flowchart 550, independent of the other hosts 110. At step 555, host 110 determines if the anomaly flag is TRUE, and, if so, at step 560, host 110 increases its window size. In one embodiment, the window size of host 110 is increased proportionally according to its QoS shares relative to host 110 that has the largest QoS share, whose window size will be increased to the maximum window size. In another embodiment, host 110 increases its window size to the maximum window size regardless of whether or not it has the largest QoS share. In still another embodiment, one or more hosts 110 increase their window sizes to the maximum window size and clients or virtual machines running in the hosts 110 have their window sizes increased in accordance with their QoS shares. If, at step 555, host 110 determines that the anomaly flag is FALSE, at step 565, host 110 adjusts its own window size according to QoS policy.

After an anomaly is detected and the anomaly flag is set to TRUE, the anomaly condition is forced to persist for a first predefined period of time so that each host 110 will have time to respond to the anomaly in accordance with method 550. At the expiration of this first predefined time period, the anomaly flag is set to FALSE. After the anomaly flag has been set to FALSE, this condition is forced to persist for a second predefined period of time to prevent the same anomaly condition from triggering another response too early. The first and second predefined periods of time are configurable by the user and may be programmatically adjusted based on real-time behavior of the shared resource.

While embodiments described above are directed to detecting and responding to an anomaly in a system where multiple clients share a common storage resource, the same principles may be applied to a system where multiple clients share a common network, such as a LAN in which clients communicate using the TCP protocol. In a shared network situation, QoS policy may be implemented to provide a guaranteed minimum bit rate, delay, jitter, packet dropping probability, or error rate. If a group of clients that are subject to the QoS policy share the same network as an unmanaged client, i.e., a client that is not bound by any QoS policy, heavy network IO from the unmanaged client will negatively impact the level of service received by the clients that are bound by the QoS policy. Thus, additional embodiments of the invention are directed to providing a method for detecting an anomaly in a shared network and triggering a response to protect against the negative effects of the anomaly detected in the shared network.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of detecting that at least one of a plurality of host computers that are accessing a shared IO resource is not abiding by a quality of service (QoS) policy that is followed by a remaining of the plurality of host computers, wherein the QoS policy governs rates at which the remaining of the plurality of host computers access the shared IO resource, the method comprising:
   computing, at periodic intervals, aggregate changes for each parameter of a set of QoS related parameters that is maintained by each of the host computers following the QoS policy, wherein a value of each parameter may change while the corresponding host is accessing the shared IO resource;
   determining whether each of computed aggregate changes exceeds a threshold value for the corresponding parameter, wherein exceeding the threshold value indicates a possibility that a host computer is accessing the shared IO resource without following the QoS policy; and
   if each of the computed aggregate changes exceeds the corresponding threshold value, storing a value in a manner accessible by each of the host computers following the QoS policy, wherein the value indicates that a host computer accessing the shared IO resource is not following the QoS policy.

2. The method of claim 1, further comprising the steps of:
   calculating an aggregate current average latency (CAL) value by averaging a per-host CAL value experienced by each of the host computers following the QoS policy, wherein each per-host CAL value is a function of (i) a latency value experienced by a most recent IO request from an issuance of the IO request to the shared IO resource by a host computer to an acknowledgement by the shared IO resource that the IO request has been fulfilled, and (ii) a pervious per-host CAL value maintain by the corresponding host computer;
   determining whether the aggregate CAL value falls within a range of a threshold value; and
   storing the value only if the aggregate CAL value falls within the range of the threshold value.

3. The method of claim 1, wherein the set of QoS-related parameters includes at least one of (i) an average latency value representing an average length of time from an issuance of an IO request to the shared IO resource by a host computer to an acknowledgement by the shared IO resource that the IO request has been fulfilled, (ii) a current size of a queue used by the corresponding host computer to track IO requests that have been issued to shared IO resource but for which the corresponding host computer has yet to receive an acknowledgement from the shared IO resource of completion, and (iii) a current number of outstanding IO requests.

4. The method of claim 1, wherein each of the host computers stores its corresponding set of QoS parameters in the shared IO resource.

5. The method of claim 1, wherein each of the host computers maintains prior values of the set of QoS parameters corresponding to previous periodic intervals.

6. The method of claim 1, wherein, in response to reading the stored value to assess an existence of a host computer that is not following the QoS policy, a host computer increases a size of a queue used by corresponding host computer to track IO requests that have been issued to the shared IO resource but for which the host computer has yet to receive an acknowledgement from the shared IO resource of completion.

7. The method of claim 6, wherein the host computer increase the size of the queue to a maximum size.

8. A computer configured to detecting that at least one of a plurality of host computers that are accessing a shared TO resource is not abiding by a quality of service (QoS) policy that is followed by a remaining of the plurality of host computers, wherein the QoS policy governs rates at which the remaining of the plurality of host computers access the shared IO resource, the computer comprising a processor configured to perform the steps of:
   computing, at periodic intervals, aggregate changes for each parameter of a set of QoS related parameters that is maintained by each of the host computers following the QoS policy, wherein a value of each parameter may change while the corresponding host is accessing the shared IO resource;
   determining whether each of computed aggregate changes exceeds a threshold value for the corresponding parameter, wherein exceeding the threshold value indicates a possibility that a host computer is accessing the shared IO resource without following the QoS policy; and
   if each of the computed aggregate changes exceeds the corresponding threshold value, storing a value in a manner accessible by each of the host computers following the QoS policy, wherein the value indicates that a host computer accessing the shared IO resource is not following the QoS policy.

9. The computer of claim 8, wherein the processor is further configured to perform the steps of:
   calculating an aggregate current average latency (CAL) value by averaging a per-host CAL value experienced by each of the host computers following the QoS policy, wherein each per-host CAL value is a function of (i) a latency value experienced by a most recent IO request from an issuance of the IO request to the shared IO resource by a host computer to an acknowledgement by the shared IO resource that the IO request has been fulfilled, and (ii) a pervious per-host CAL value maintain by the corresponding host computer;
   determining whether the aggregate CAL value falls within a range of a threshold value; and
   storing the value only if the aggregate CAL value falls within the range of the threshold value.

10. The computer of claim 8, wherein the set of QoS-related parameters includes at least one of (i) an average latency value representing an average length of time from an issuance of an IO request to the shared IO resource by a host computer to an acknowledgement by the shared IO resource that the IO request has been fulfilled, (ii) a current size of a queue used by the corresponding host computer to track IO requests that have been issued to shared IO resource but for which the corresponding host computer has yet to receive an acknowledgement from the shared IO resource of completion, and (iii) a current number of outstanding IO requests.

11. The computer of claim 8, wherein each of the host computers stores its corresponding set of QoS parameters in the shared IO resource.

12. The computer of claim 8, wherein each of the host computers maintains prior values of the set of QoS parameters corresponding to previous periodic intervals.

13. The computer of claim 8, wherein, in response to reading the stored value to assess an existence of a host computer that is not following the QoS policy, a host computer increases a size of a queue used by corresponding host computer to track IO requests that have been issued to the shared IO resource but for which the host computer has yet to receive an acknowledgement from the shared IO resource of completion.

14. The computer of claim 13, wherein the host computer increase the size of the queue to a maximum size.

15. A non-transitory computer-readable medium comprising instructions that when executed by a processor detect that at least one of a plurality of host computers that are accessing a shared IO resource is not abiding by a quality of service (QoS) policy that is followed by a remaining of the plurality of host computers, wherein the QoS policy governs rates at which the remaining of the plurality of host computers access the shared IO resource, by performing the steps of:

computing, at periodic intervals, aggregate changes for each parameter of a set of QoS related parameters that is maintained by each of the host computers following the QoS policy, wherein a value of each parameter may change while the corresponding host is accessing the shared IO resource;

determining whether each of computed aggregate changes exceeds a threshold value for the corresponding parameter, wherein exceeding the threshold value indicates a possibility that a host computer is accessing the shared TO resource without following the QoS policy; and if each of the computed aggregate changes exceeds the corresponding threshold value, storing a value in a manner accessible by each of the host computers following the QoS policy, wherein the value indicates that a host computer accessing the shared IO resource is not following the QoS policy.

16. The non-transitory computer-readable medium of claim 15, further comprising instructions that perform the steps of:

calculating an aggregate current average latency (CAL) value by averaging a per-host CAL value experienced by each of the host computers following the QoS policy, wherein each per-host CAL value is a function of (i) a latency value experienced by a most recent IO request from an issuance of the IO request to the shared IO resource by a host computer to an acknowledgement by the shared IO resource that the IO request has been fulfilled, and (ii) a pervious per-host CAL value maintain by the corresponding host computer;

determining whether the aggregate CAL value falls within a range of a threshold value; and storing the value only if the aggregate CAL value falls within the range of the threshold value.

17. The non-transitory computer-readable medium of claim 15, wherein the set of QoS-related parameters includes at least one of (i) an average latency value representing an average length of time from an issuance of an IO request to the shared IO resource by a host computer to an acknowledgement by the shared IO resource that the IO request has been fulfilled, (ii) a current size of a queue used by the corresponding host computer to track IO requests that have been issued to shared IO resource but for which the corresponding host computer has yet to receive an acknowledgement from the shared IO resource of completion, and (iii) a current number of outstanding IO requests.

18. The non-transitory computer-readable medium of claim 15, wherein each of the host computers stores its corresponding set of QoS parameters in the shared IO resource.

19. The non-transitory computer-readable medium of claim 15, wherein each of the host computers maintains prior values of the set of QoS parameters corresponding to previous periodic intervals.

20. The non-transitory computer-readable medium of claim 15, wherein, in response to reading the stored value to assess an existence of a host computer that is not following the QoS policy, a host computer increases a size of a queue used by corresponding host computer to track IO requests that have been issued to the shared IO resource but for which the host computer has yet to receive an acknowledgement from the shared IO resource of completion.

\* \* \* \* \*